United States Patent
Jun

(10) Patent No.: US 11,663,848 B2
(45) Date of Patent: May 30, 2023

(54) GATE-ON-ARRAY BASED ROLLING SHUTTER TIMING CONTROLLING DEVICE AND CONTROLLING METHOD

(71) Applicant: HiDeep Inc., Seongnam-si (KR)

(72) Inventor: Sung Chun Jun, Seongnam-si (KR)

(73) Assignee: HiDeep Inc.

( * ) Notice: Subject to any disclaimer, the term of this patent is extended or adjusted under 35 U.S.C. 154(b) by 84 days.

(21) Appl. No.: 17/458,668

(22) Filed: Aug. 27, 2021

(65) Prior Publication Data

US 2022/0070394 A1    Mar. 3, 2022

(30) Foreign Application Priority Data

Aug. 27, 2020  (KR) .................. 10-2020-0108308

(51) Int. Cl.
    *G06V 40/13*    (2022.01)
(52) U.S. Cl.
    CPC .................. *G06V 40/1318* (2022.01)
(58) Field of Classification Search
    CPC ............ G06V 40/1318; H04N 5/3454; H04N 5/3765; H04N 5/3532; G06K 19/0718; G06K 19/07354
    See application file for complete search history.

(56) References Cited

U.S. PATENT DOCUMENTS

2017/0318242 A1*  11/2017  Cho .................. H04N 5/353
2020/0065541 A1*   2/2020  Jung ................. G06V 40/1329

FOREIGN PATENT DOCUMENTS

| JP | 2007011233 A | 1/2007 |
| KR | 1020130041801 | 4/2013 |
| KR | 1020160058489 | 5/2016 |
| KR | 1620200022060 A | 3/2020 |
| KR | 102124623 B1 | 6/2020 |

* cited by examiner

*Primary Examiner* — Abhishek Sarma
(74) *Attorney, Agent, or Firm* — The Belles Group, P.C.

(57) ABSTRACT

The present invention includes a device for controlling rolling shutter timing, the device including: a first Gate-On-Array (GOA) driving unit configured to generate a reset signal for resetting an image sensor in a unit of a gate line; a second GOA driving unit configured to generate a scan signal for scanning the image sensor in the unit of the gate line; and a timing controller configured to control generation timing of the reset signal and the scan signal. According to the device and the method of controlling rolling shutter timing based on GOA, it is possible to satisfy a bezel-less edge level of a display panel of a smart phone, expand a fingerprint recognition area to a large area by rapidly reading a fingerprint location area, freely control an exposure time, and reduce occurrence of a delay time.

12 Claims, 16 Drawing Sheets

PRIOR ART

| full frame first scan | full frame second scan | full frame third scan | full frame N th scan |
|---|---|---|---|
| scan full lines: 2560 | scan full lines: 2560 | scan full lines: 2560 | scan full lines: 2560 |
| 60ms or 90ms or longer scan | 60ms or 90ms or longer scan | 60ms or 90ms or longer scan | 60ms or 90ms or longer scan |

FIG. 1A

| fast full frame reset (10ms) | long exposure | sub frame scan (20ms) | fast full frame reset (10ms) | long one frame exposure | sub frame scan (20ms) |
|---|---|---|---|---|---|
| reset full lines: 2560 | 60ms or 90ms or other long exposure | scan sub lines: 200 | reset full lines: 2560 | 60ms or 90ms or other long exposure | scan sub lines: 200 |

FIG. 1B

GATE-ON-ARRAY BASED ROLLING SHUTTER TIMING CONTROLLING DEVICE AND CONTROLLING METHOD

CROSS-REFERENCE TO RELATED APPLICATIONS

This application claims priority to and the benefit of Korean Patent Application No. 10-2020-0108308 filed in the Korean Intellectual Property Office on Aug. 27, 2020, the entire contents of which are incorporated herein by reference.

TECHNICAL FIELD

The present invention relates to a device and a method of controlling rolling shutter timing based on Gate-On-Array (GOA).

BACKGROUND ART

Recently, a bezel-less design with a minimal border has been common in a smart phone display. According to the bezel-less design trend, the existing electrostatic charge-type fingerprint recognition sensor, which has been widely adopted, has no space to be placed on the front surface of the smart phone, and thus, a method of displaying the fingerprint recognizing sensor on the rear surface of the smart phone was adopted. However, the disposition of the fingerprint recognition sensor on the rear surface has the problem that sentience is lowered when the fingerprint recognition sensor is used, and in order to solve the problem, a smart phone, in which a CMOS image sensor module having an ultra-small optical structure that recognizes a fingerprint at a small area level of 8 mm×8 mm or less by using a characteristic of a display panel that allows light to pass through a certain extent is disposed on a rear surface of the display panel, and the recognition of the fingerprint is performed on the front surface of the smart phone, is commercialized.

However, these solutions also bring considerable inconvenience to users because the user has to perform fingerprint recognition in a specified area of a large-area display, that is, in a very small area of about 8 mm×8 mm. There are continuous demands for a large-area fingerprint recognition solution with 5 cm×3 cm or more, which is capable of eliminating the inconvenience of performing verification by pressing a specified area for the fingerprint recognition, and supporting additional functions, such as application launch with fingerprint ID verification, on the full screen or partial screen of a smart phone.

The fundamental reason that the CMOS image sensor solution only provides a fingerprint recognition function in a small area of 8 mm×8 mm is price competitiveness. The CMOS image sensor is made of a silicon material, and when a large CMOS image sensor of 5 cm×3 cm is manufactured, the large CMOS image sensor is not suitable in terms of cost, manufacturing technology, and the like. Alternatively, a large optical structure in which a size of the CMOS image sensor is maintained at the level of 5 mm×5 mm, the number of pixels is increased, and a large area is covered, may be used, but there is a problem in that it is impossible to manufacture a smart phone with a thin and flat structure.

As a large-area image sensor solution candidate which is capable of solving the problem according to the fingerprint recognition in a narrow area and is costly and technically acceptable by set makers, a large-area TFT image sensor solution based on a TFT backplane having a simple and compact optical structure, such as a microlens collimator, has emerged, and a lot of research is currently conducted.

The TFT image sensor requires exposure control, similar to the CMOS image sensor, and x-ray, standalone fingerprint sensing and the like, in which the TFT image sensor is currently utilized, uses a method in which a long exposure time, such as 1 frame time 60 ms to 90 ms, is used as a fixed, and an AFE output voltage entering an ADC input is ADC-converted by placing AFE output voltage in an ADC input voltage range by selecting a large AFE feedback cap to output a digital signal. In this case, an output value is controlled at the level where the AFE feedback cap is adjustable, so there is a problem in that the degree of freedom is reduced compared to a method of controlling an exposure time.

The TFT image sensor is operated at the exposure of 1 frame time 60 ms to 90 ms or more, or at a large exposure that is always fixed, so there is a problem in that there is a delay time of 60 ms to 90 ms when the first frame data is output even when it is not necessary to use a long exposure.

Korean Patent Application Laid-Open No. 10-2013-0041801 (title of the invention: TFT-LCD panel and driving method thereof) discloses a TFT-LCD panel which is capable of increasing power consumption of a logic circuit of a panel even at a high refresh rate, but is simply limited to the TFT-LCD panel provided with a GOA and has a structure in which it is difficult to perform fingerprint recognition, so that Korean Patent Application Laid-Open No. 10-2013-0041801 is insufficient to solve the above-mentioned problem, and is difficult to be applied to the fingerprint recognition because a Back Light Unit (BLU) for driving an LCD interferes with optical signal collection.

Korean Patent No. 10-2124623 (title of the invention: Display Device capable of Recognizing Fingerprint) discloses a display device which is capable of recognizing a fingerprint and improving a contrast ratio of a fingerprint pattern, but is insufficient to suggest the foregoing fingerprint recognition solution.

SUMMARY OF THE INVENTION

The present invention has been made in view of the above technical requirements, and an object of the present invention provides a device and a method of controlling rolling shutter timing based on Gate-On-Array (GOA), which satisfy a bezel-less edge level of a display panel of a smart phone, expand a fingerprint recognition area to a large area by rapidly reading a fingerprint location area, freely control an exposure time, and reduce occurrence of a delay time.

In order to implement a rolling shutter exposure control method in which exposure may be variably adjusted, the gate controls of two exposure frame and scan frame need to rotate independently and continuously with a time difference as much as the exposure, and a gate control driving circuit requires the implementation based on a GOA circuit that is a core method in implementing a bezel-less edge for satisfying a bezel-less edge level of a display panel of a smart phone. Further, in order for a large-area or full-screen fingerprint recognition solution to work properly, it is essential to receive touch information of a finger, receive information about an area in a TFT image sensor in which a fingerprint is located, and rapidly output only the area in which the fingerprint is located to a Secure Processor (SP) of an Application Processor (AP).

In this context, an object of the present invention is to provide a method and a device for controlling rolling shutter timing based on GOA, which are capable of using a GOA circuit-based gate control suitable for implementing a thin gate control located at a lateral side of an image sensor to match a thin side of a bezel-less display in a large-area fingerprint recognition solution, partially reading an area in which a fingerprint is located rapidly, and controlling exposure with various values.

An exemplary embodiment of the present invention provides a device for controlling rolling shutter timing, the device including: a first Gate-On-Array (GOA) driving unit configured to generate a reset signal for resetting an image sensor in a unit of a gate line; a second GOA driving unit configured to generate a scan signal for scanning the image sensor in the unit of the gate line; and a timing controller configured to control generation timing of the reset signal and the scan signal.

When frame reset and frame scan of the image sensor are controlled with one scan signal, a logical sum of the reset signal and the scan signal, which are generated in the first GOA driving unit and the second GOA driving unit, respectively, may be used as a scan signal.

The generation of the reset signal and the scan signal may be controlled based on a sub window enable signal for resetting or scanning a specific area in an entire area of the image sensor.

When the reset signal and the scan signal share the same enable signal in a line time, the timing controller may generate a control signal for time-dividing the enable signal and providing the time-divided enable signal.

The timing controller may generate frame timing independent to each of frame reset and frame scan, and control the frame reset and the frame scan to be indefinitely operated with a time difference corresponding to an exposure time.

When an exposure value (exposure time) is larger than one line time, the timing controller may control the scan signal to be generated before the reset signal, and when the exposure value (exposure time) is smaller than one line time, the timing controller may control the reset signal to be generated before the scan signal.

The first GOA driving unit and the second GOA driving unit may include a plurality of shift registers connected to a plurality of gate lines, respectively, of the image sensor.

The image sensor may include a plurality of pixels defined by intersections of a plurality of rows of gate lines and a plurality of columns of data lines, and the plurality of pixels may include: a storage capacitor; a photo diode configured to detect light which is reflected from a fingerprint and incident, and changes a potential state of the storage capacitor; and a thin film transistor connected to the storage capacitor and the photo diode, and configured to transmit a detection signal according to the potential state of the storage capacitor.

Another exemplary embodiment of the present invention provides a method of controlling rolling shutter timing, the method including: generating, by a first Gate-On-Array (GOA) driving unit, a reset signal for resetting an image sensor in a unit of a gate line; and generating, by a second GOA driving unit, a scan signal for scanning the image sensor in the unit of the gate line, in which the image sensor is an image sensor based on a thin film transistor, the first GOA driving unit and the second GOA driving unit include a plurality of shift registers connected to a plurality of gate lines, respectively, of the image sensor, and generation timing of the reset signal and generation timing of the scan signal are separately controlled.

When frame reset and frame scan of the image sensor are controlled with one scan signal, a logical sum of the reset signal and the scan signal, which are generated in the first GOA driving unit and the second GOA driving unit, respectively, may be used as a scan signal.

The generation of the reset signal and the scan signal may be controlled based on a sub window enable signal for resetting or scanning a specific area in an entire area of the image sensor.

When the reset signal and the scan signal share the same enable signal in a line time, a control signal for time-dividing the enable signal and providing the time-divided enable signal may be generated.

Each of frame reset and frame scan may be controlled with independent frame timing, and the frame reset and the frame scan may be indefinitely operated with a time difference corresponding to an exposure value.

The method may further include: when an exposure value (exposure time) is larger than a line time, controlling the scan signal to be generated before the reset signal, and when the exposure value (exposure time) is smaller than the line time, controlling the reset signal to be generated before the scan signal.

According to the device and the method of controlling rolling shutter timing based on GOA, it is possible to satisfy a bezel-less edge level of a display panel of a smart phone, expand a fingerprint recognition area to a large area by rapidly reading a fingerprint location area, freely control an exposure time, and reduce occurrence of a delay time.

BRIEF DESCRIPTION OF THE DRAWINGS

FIGS. 1A-1B illustrate existing exposure control methods of a TFT image sensor.

DETAILED DESCRIPTION

Figure 2:
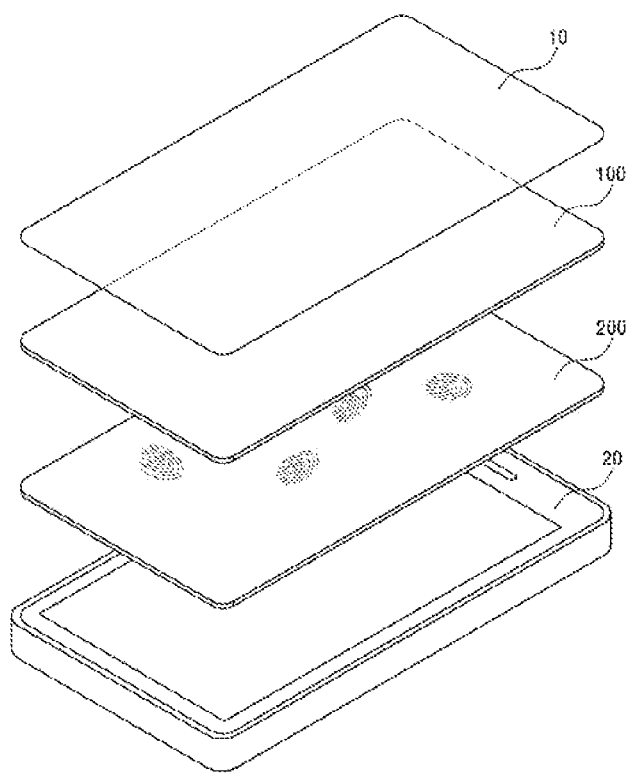
FIG. 2 illustrates a smart device to which a device and a method of controlling rolling shutter timing according to the present invention are applied.

In the detailed description of the present invention described below, reference is made to the accompanying drawings, which illustrate a specific exemplary embodiment in which the present invention may be carried out, as an example. The exemplary embodiment is described in detail sufficient to enable a person skilled in the art to carry out the present invention. It should be understood that various exemplary embodiments of the present invention are different from each other, but need not to be mutually exclusive. For example, specific shapes, structures, and characteristics described herein may be implemented in other exemplary embodiments without departing from the spirit and the scope of the present invention in relation to one exemplary embodiment. Further, it should be understood that a location or disposition of an individual component in each disclosed exemplary embodiment may be changed without departing from the spirit and the scope of the present invention. Accordingly, the detailed description below is not intended to be taken in a limited meaning, and the scope of the present invention, if appropriately described, is limited only by the appended claims along with all scopes equivalent to those claimed by the claims. Like reference numerals in the drawings refer to the same or similar functions over several aspects.

FIGS. 1A-1B illustrates an existing exposure control method of a TFT image sensor. The method of FIG. 1A is the method called a full frame scan and charge transfer exposure, and full frame scan is used for sensor panel reset, and accordingly, first scan data of the full frame is discarded. Thereafter, each line scan is performed in the full frame first scan, and each line enters an exposure state. Accordingly, in the full frame second scan, each line has an exposure time effect corresponding to the first frame scan time. This exposure and scan method is referred to as a full frame scan or charge transfer exposure, and it is simple to control exposure, but the exposure time is inevitably fixed to the full frame scan time, and even though a short exposure time is required, a first scan data delay is always a full frame time. According to the foregoing method, there is a problem in that scan data cannot be generated in the first frame, and scan data is generated from the second frame.

The method of FIG. 1B is the improved method of the method of FIG. 1A, and is a fast full frame reset exposure and sub window scan method in which an exposure time is set after rapidly resetting a full frame (entire lines) and then a desired sub frame is scanned. In this case, a shutter time of each line is changed, so that there is a problem in that the degree of exposure is different in the unit of the line. When the TFT image sensor is driven with a very short shutter time, a difference in the exposure time may greatly affect an image quality. In the case of FIG. 1B, since it is impossible to overlap a sub frame scan of a current frame and a sub frame scan of a next frame, it is impossible to implement the rolling shutter method.

The present invention is a device and a method of controlling shutter timing deviating from the foregoing existing method, and may sufficiently implement the rolling shutter method, and the present invention uses a Gate-On-Array (GOA), so that it is possible to achieve a bezel-less characteristic of a smart phone.

FIG. 2 illustrates a smart device to which a device and a method of controlling rolling shutter timing according to the present invention are applied. As illustrated in FIG. 2, a smart device includes a display panel 100 and a fingerprint recognition image sensor 200, and the fingerprint recognition image sensor 200 may be a large-area image sensor which is capable of recognizing a fingerprint in an entire area of the display panel. A size of the image sensor 200 may be the same as or smaller than a size of the display panel 100. In order to implement the bezel-less smart device as illustrated in FIG. 2, the display panel uses a GOA driving unit 110, and in the present invention, the image sensor 200 also includes a GOA driving unit 210, so that it is possible to implement the smart device capable of recognizing a fingerprint in the bezel-less form. In FIG. 2, the smart device is illustrated as the smart phone, but is not limited thereto, and may be implemented with various smart devices, such as a tablet Personal Computer (tablet PC), a mobile phone, a video phone, an e-book reader, a desktop PC, a laptop PC, a netbook computer, a Personal Digital Assistant (PDA), a Portable Multimedia Player (PMP), a wearable device (for example: a smart watch)), and a kiosk. A cover glass 10 may be provided on the display panel 100.

Figure 3:
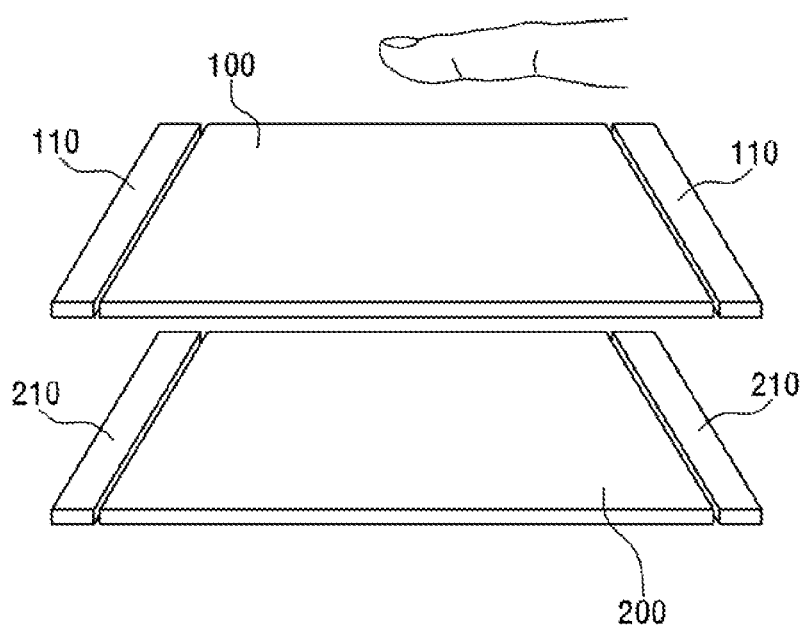
FIG. 3 is a schematic diagram of the smart device to which the device and the method of controlling rolling shutter timing according to the present invention are applied.

FIG. 3 is a schematic diagram of the smart device to which the device and the method of controlling rolling shutter timing according to the present invention are applied. As illustrated in FIG. 3, the display panel 100 and the image sensor 200 includes one or more GOA driving units 110 and 210, respectively. The display panel 100 and the image sensor 200 may include two GOA driving units 110 and 210, respectively. That is, the GOA driving unit 110 for the display panel may be provided at one side, both sides, an upper side, a lower side, a left side, or a right side of the display panel 100, and the GOA driving unit 210 for the image sensor may be provided at one side, both sides, an upper side, a lower side, a left side, or a right side of the image sensor 200.

The plurality of shift registers is configured as a chain and is synchronized to a line time clock, so that the GOA driving unit 210 for the image sensor generates a pulse while sequentially turning on and turning off an output of the shift register according to a line time period and opens a gate of each line of the image sensor.

The display panel 100 is implemented as a touch screen to detect a touch input of a user. In another exemplary embodiment, a touch panel is separately provided to detect a touch input of a user. The touch screen or the touch panel may detect (2D touch) only a touch position, but may also detect a touch pressure (3D touch, force touch).

Figure 4:
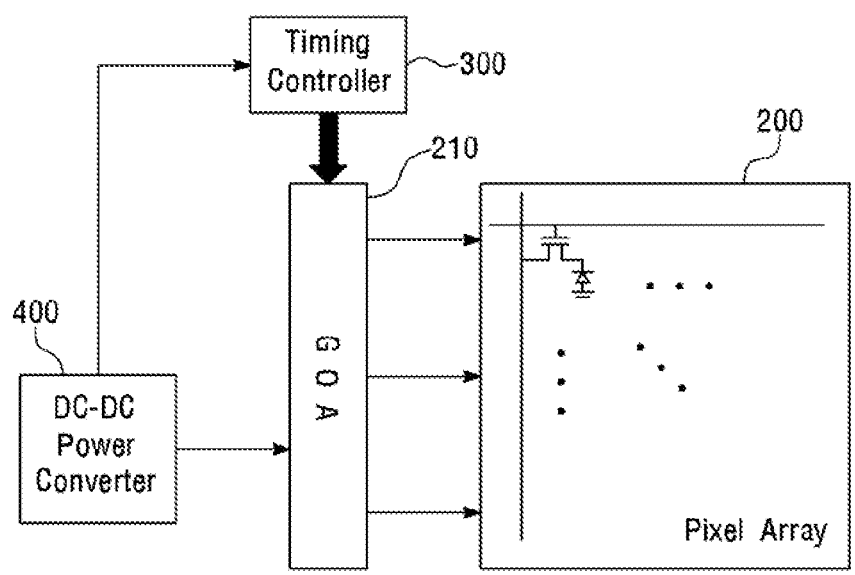
FIG. 4 schematically illustrates a configuration of the device for controlling rolling shutter timing according to the present invention.

FIG. 4 schematically illustrates a configuration of the device for controlling rolling shutter timing according to the present invention. As illustrated in FIG. 4, the device for controlling rolling shutter timing includes a timing controller, the GOA driving unit, and the image sensor.

The timing controller 300 determines timing of a signal applied to each gate line of the image sensor 200. The GOA driving unit 210 is connected with each gate line of the image sensor 200 and transmits a scan signal and a reset signal.

The image sensor 200 includes a plurality of pixels defined by intersections of the plurality of rows of gate lines and the plurality of columns of data lines. Each pixel includes a storage capacitor, a photo diode, and a thin film transistor. The photo diode detects light reflected from a fingerprint and incident and changes a potential state of the storage capacitor. The thin film transistor is connected to the storage capacitor and the photo diode to transmit a detection signal according to the potential state of the storage capacitor. A DC-DC power converter 400 supplies power for driving the image sensor 200, the GOA driving unit 210, and the timing controller 300.

Figure 5:
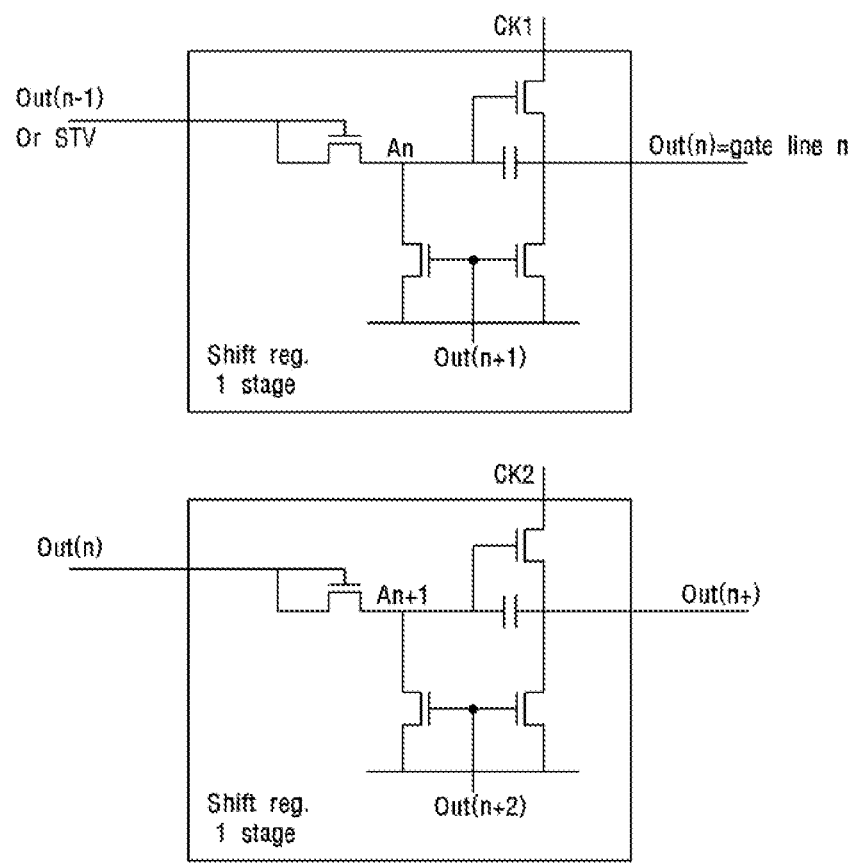
FIG. 5 illustrates a circuit configuration of a Gate-On-Array (GOA) driving unit of the device for controlling rolling shutter timing according to the present invention.
Figure 6:
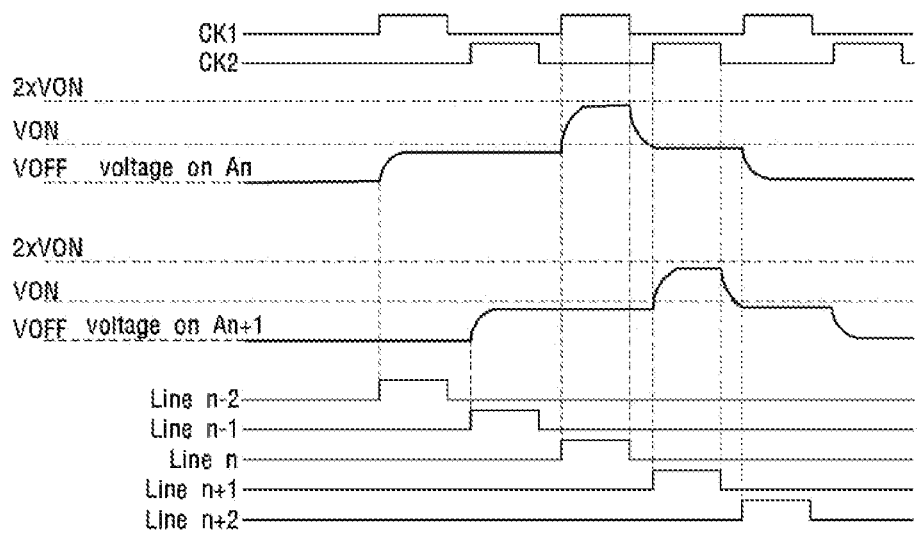
FIG. 6 illustrates an example of a general signal generating method of the GOA driving unit of the device for controlling rolling shutter timing according to the present invention.

FIG. 5 illustrates a circuit configuration of a Gate-On-Array (GOA) driving unit of the device for controlling rolling shutter timing according to the present invention, and FIG. 6 illustrates an example of the general signal generation of the GOA driving unit of the device for controlling rolling shutter timing according to the present invention.

As illustrated in FIG. 5, the GOA driving unit 210 is formed of the shift register chain, and a signal is output to each gate line by clock signals CK1 and CK2.

Referring to FIGS. 5 and 6, when an input terminal Out(n−1) is turned on, a voltage of a node An raises from VOFF to VON−Vt (Vt is a voltage value of an input TFT). Thereafter, when a first clock signal CK1 is applied, the voltage of the node An raises from VON−Vt to 2×VON by a feedback capacitor and the nth line is turned on. Next, when the n+1th line is turned on, the voltage of the node An is reset to VOFF, and the value is applied to the nth line.

A voltage of a node An+1 is also changed as described above by the application of a second clock signal CK2. That is, when the input terminal Out(n) is turned on, the voltage of the node An+1 raises from VOFF to VON−Vt (Vt is a voltage value of the input TFT). Thereafter, when the second clock signal CK2 is applied, the voltage of the node An+1 is raised from VON−Vt to 2×VON by a feedback capacitor and the n+1th line is turned on. Next, when the n+2th line is turned on, the voltage of the node An+1 is reset to VOFF, and the value is applied to the n+1th line.

Figure 7:
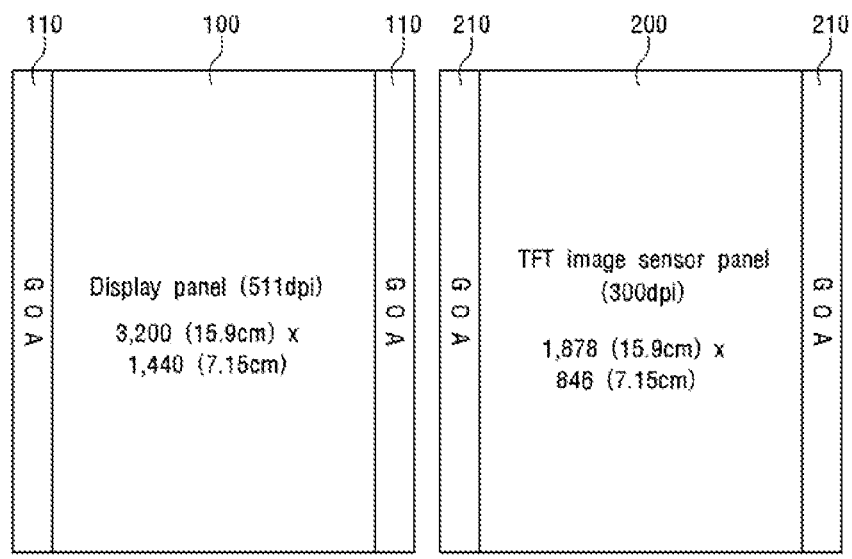
FIG. 7 illustrates an exemplary embodiment of a display panel and an image sensor configuring the device for controlling rolling shutter timing according to the present invention.

FIG. 7 illustrates the image sensor 200 operated by the GOA driving unit 210 operated as described above. The display panel 100 adopting the GOA driving unit for implementing a bezel-less edge is illustrated at the left side of FIG. 7, and the image sensor 200 operated by the GOA driving unit is illustrated at the right side of FIG. 7.

In FIG. 7, the display panel 100 has 511 dpi and a size of 3,200 (15.9 cm)×1,440 (7.15 cm), and the image sensor 200 has 300 dpi and a size of 1,878 (15.9 cm)×846 (7.15 cm), but this is merely illustrative, and the display panel 100 and the image sensor 200 may be implemented in various sizes. The size of the image sensor 200 is not necessarily the same as the size of the display panel 100. The image sensor 200 based on the GOA driving illustrated in FIG. 7 is disposed in a lower portion of the display panel 100, and detects a fingerprint of a user's finger that is in contact with the display panel (or the cover glass on the display panel).

Figure 8:
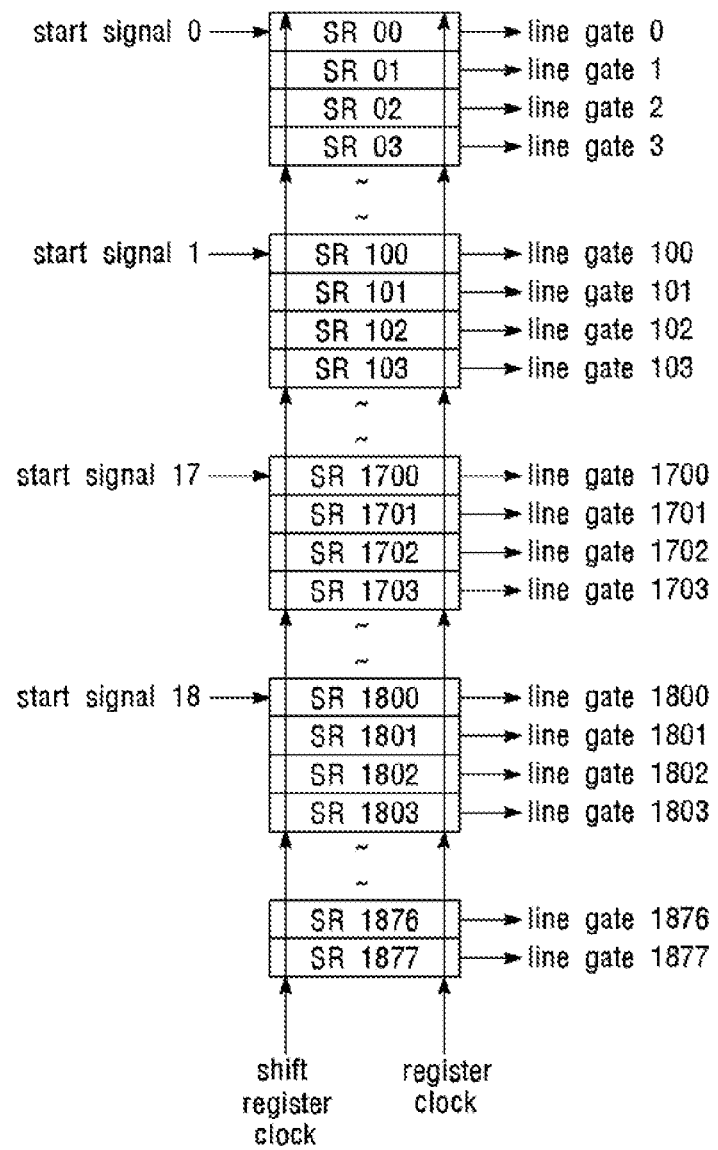
FIG. 8 illustrates a circuit block of the GOA driving unit of the device for controlling rolling shutter timing.

FIG. 8 illustrates a circuit block of the GOA driving unit of the device for controlling rolling shutter timing. The circuit block of the GOA driving unit 210 includes a shift register, shift register clocks, a register reset signal, and a sub window start signal.

In the case of the frame scan, when a specific area in the entire area of the image sensor 200 is desired to be first scanned (read), a start signal corresponding to the corresponding area may be first sent and read. In the case where windowing is not set, one start signal is enough, but in the present invention, the windowing is performed so that a specific area is selectively scanned, so that there are the plurality of start signals. FIG. 8 illustrates the state where sub windows are set in the unit of 100 lines, and in another exemplary embodiment, the sub window may be set with a set of the different number of lines.

Similar to the case of the frame reset, when a specific area in the entire area of the image sensor 200 is desired to be first reset, a start signal corresponding to the corresponding area may be first sent and reset.

In the present invention, in order to implement the rolling shutter exposure control method in which exposure may be variably adjusted, the gate controls of two exposure frame and scan frame may rotate independently and continuously with a time difference as much as the exposure, and the shift register, the shift register clock, the register reset signal, and the sub window start signal corresponding to each of the frame reset and the frame scan are provided for the independent operation.

Figures 9A, 9B:
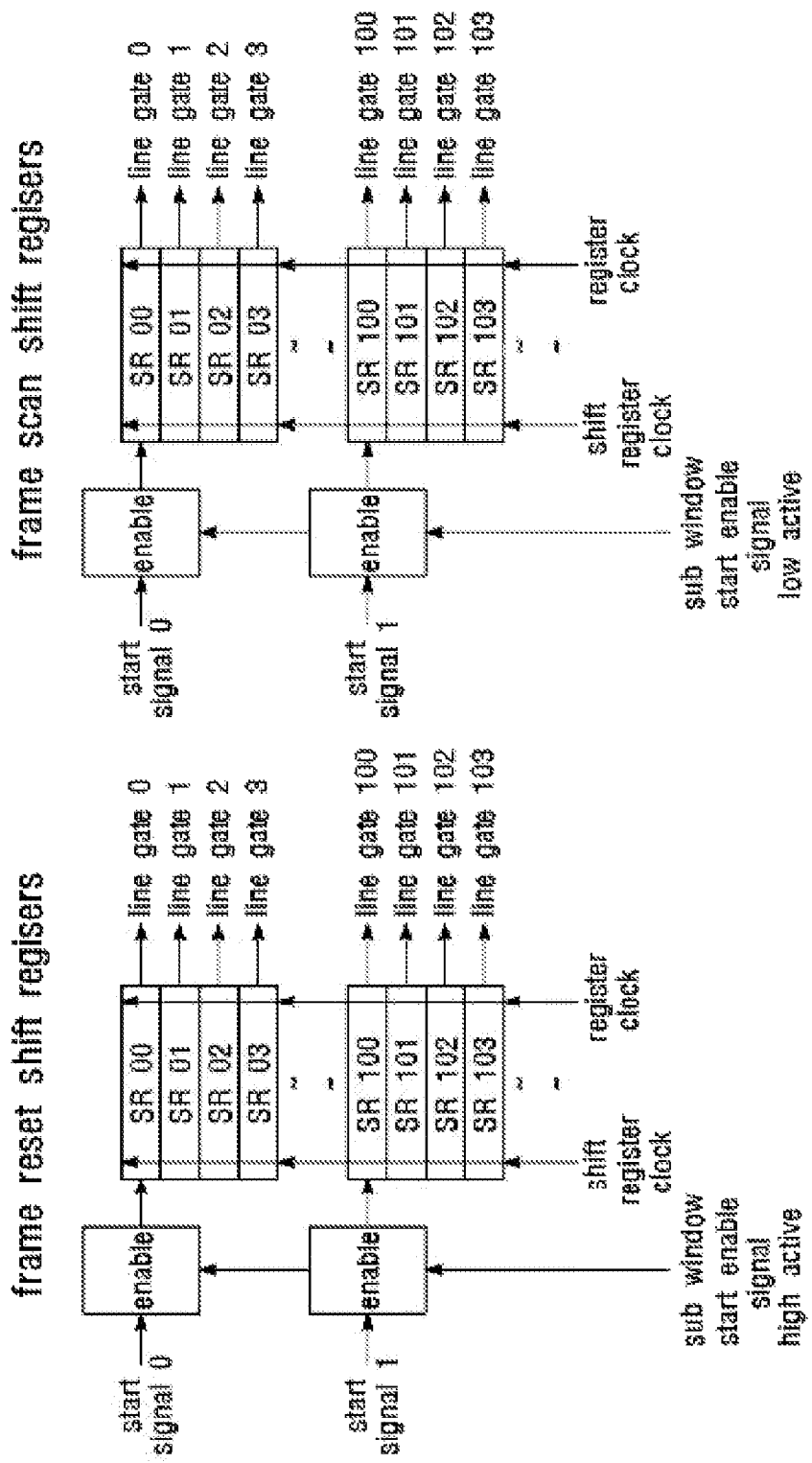
FIGS. 9A-9B are diagrams for describing an operation of a frame reset shift register and an operation of a frame scan shift register.

FIGS. 9A-9B are diagrams for describing an operation of a frame reset shift register and an operation of a frame scan shift register.

A size of the sub window may be preset by a user. In the case of the start signal, the number of start signals may be varied according to the size of the sub window. For example, when the total gate lines are 1,878 and the sub window is set in the unit of 100 lines, 18 start signals are demanded. When two sets of 18 signals are provided for the frame reset and the frame scan gate control, it may be a bit of a burden to implement the bezel-less edge.

In order to solve the foregoing problem, the present invention time-divides and generates a line gate signal of the frame scan and a line gate signal of the frame reset so that the line gate signals are not sent in one line time simultaneously. In particular, the line gate signal of the frame reset is generated earlier than the line gate signal of the frame scan. More particularly, the line gate signal of the frame scan may be sent to a middle portion (for example, ½ point of the line time) of the line time, and the line gate signal of the frame reset may be sent to an end portion (for example, after ¾ point of the line time) of the line time.

As illustrated in FIGS. 9A-9B, the generation of the reset signal and the scan signal may be controlled based on a sub window enable signal for resetting or scanning the specific area in the entire area of the image sensor 200.

In this case, when the reset signal and the scan signal share the same enable signal in the line time, the enable signal may be time-divided and shared. When the reset signal and the scan signal share the same enable signal in the line time, the timing controller 300 may generate a control signal for time-dividing the enable signal and providing the time-divided enable signal.

The timing controller 300 may generate frame timing independent to each of the frame reset and the frame scan, and control the frame reset and the frame scan to be indefinitely operated with a time difference corresponding to the exposure time.

Figure 10:
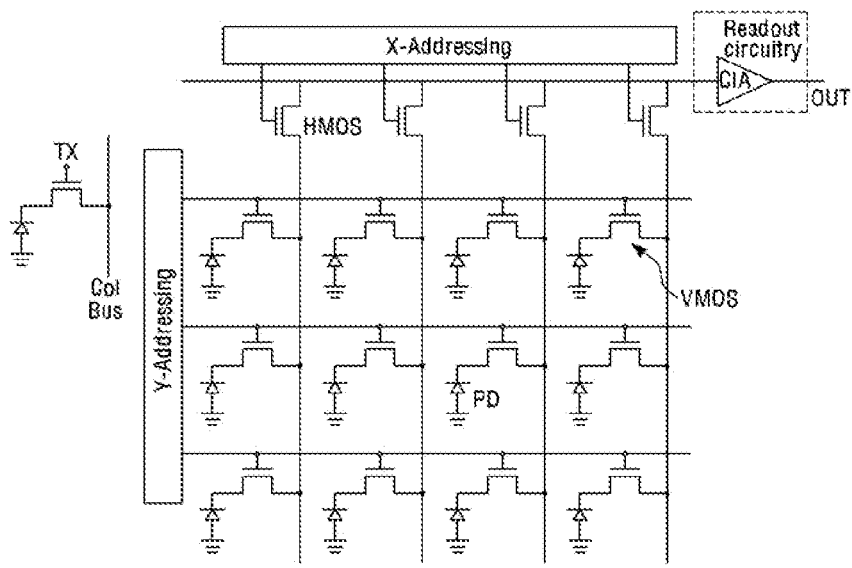
FIG. 10 illustrates passive pixel circuit and sensor structures.
Figure 11:
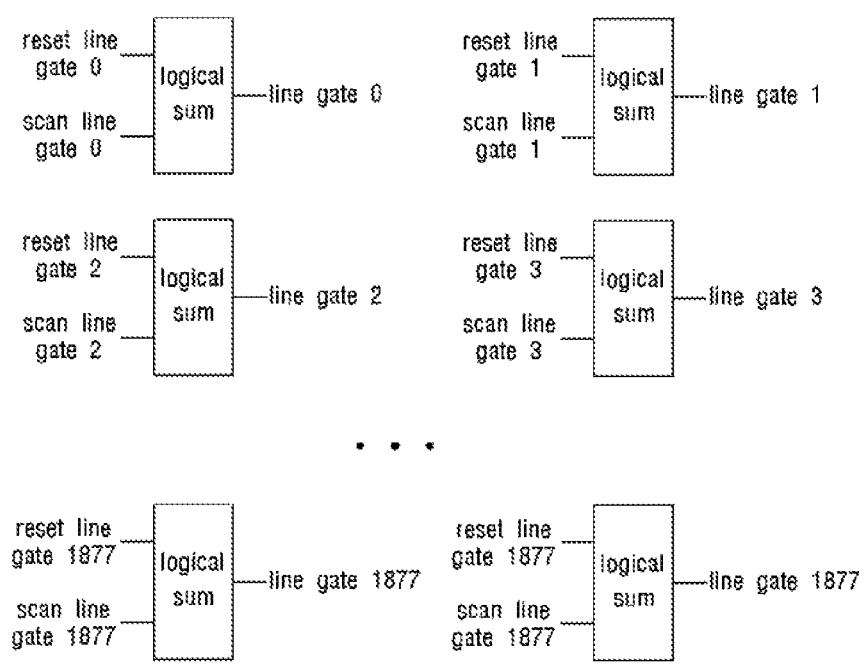
FIG. 11 illustrates a method of generating a final line gate signal in the passive pixel circuit.

FIG. 10 illustrates passive pixel circuit and sensor structures, and FIG. 11 illustrates a method of generating a final line gate signal in the passive pixel circuit.

A passive pixel circuit has a simple structure in which one transistor is provided in a photo diode because a voltage is not converted in a pixel. In the photo diode of the passive pixel circuit, a photocurrent generated by light is accumulated as charge in a capacitance of the photo diode. The transistor of the passive pixel circuit is a switch for selecting a pixel to read a signal, and when a voltage is applied to a row line, the switch is off and the accumulated charge is transmitted to a voltage converter through a column line.

When the passive pixel circuit is adopted, the frame reset is performed through the scan gate signal, so that it is necessary to control the scan gate signal like the frame scan. As described above, there occurs the case where the frame reset and the frame scan controls the same signal, so that the device for controlling rolling shutter timing according to the present invention generates a final line gate output through a logical sum of the frame reset shift register output and the frame scan shift register output, as illustrated in FIG. 11.

That is, when the frame reset and the frame scan of the image sensor 200 are controlled with one scan signal, the logical sum of the reset signal and the scan signal generated in the first GOA driving unit and the second GOA driving unit, respectively, is used as the scan signal.

Figure 12:
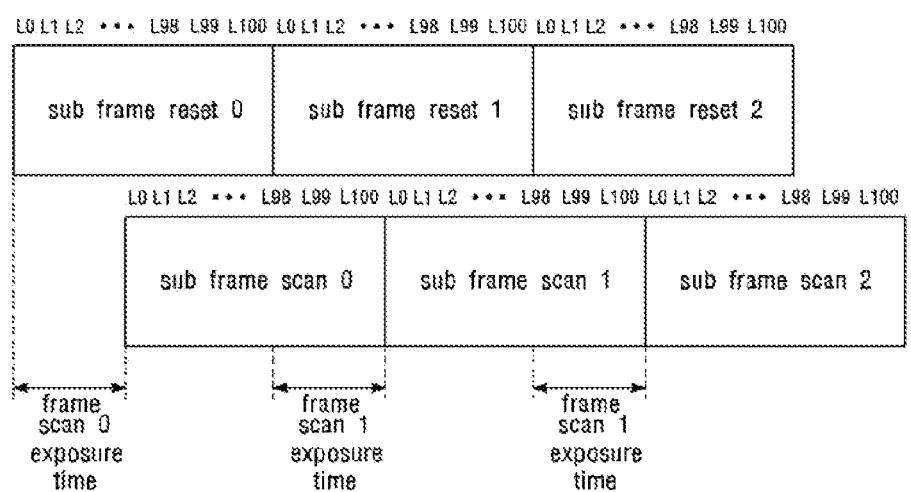
FIG. 12 illustrates rolling shutter operation timing in the unit of a frame when an exposure time is smaller than a frame reset time (frame scan time).
Figure 13:
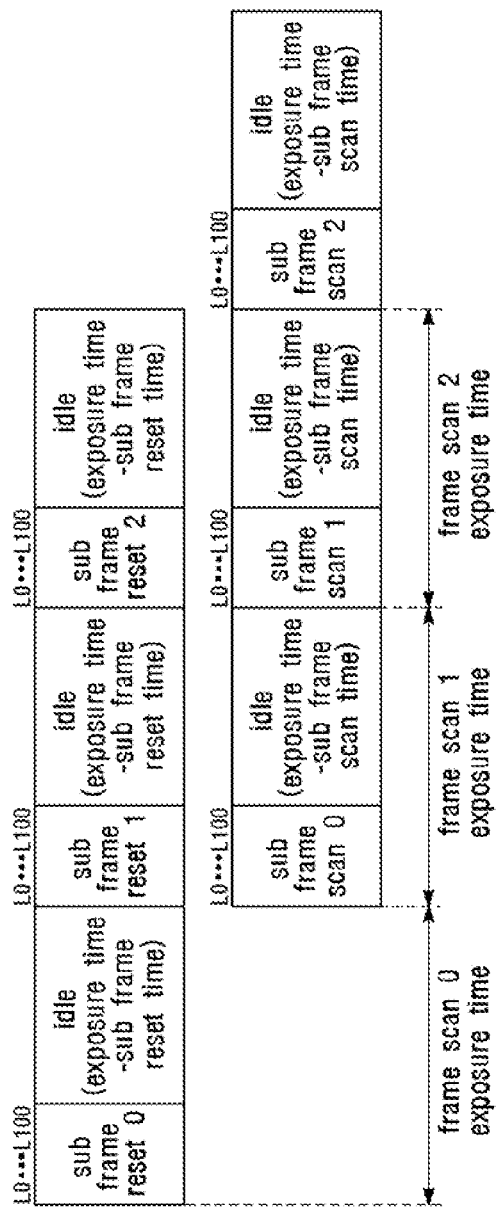
FIG. 13 illustrates rolling shutter operation timing in the unit of a frame when the exposure time is larger than the frame reset time (frame scan time).

FIGS. 12 and 13 are timing diagrams of a method of controlling rolling shutter timing according to the present invention.

As described above, in order to use the GOA driving unit, and control the exposure with various values while sharing the sub window start signal in the frame reset and the frame scan and rapidly reading the partial specific area of the entire image sensor 100, the timing control illustrated in FIGS. 12 and 13 is demanded.

The timing controller 300 independently generates GOA control signals in the unit of the line time of the frame reset and the frame scan with a time difference of the exposure value. The line times of the frame reset and the frame scan are the same, and the frame times formed of the line times are the same. Accordingly, even after several tens or hundreds of frames, the time difference between the frames of the frame reset and the frame scan corresponding to the exposure value is maintained the same.

FIG. 12 illustrates rolling shutter operation timing in the unit of a frame when an exposure time is smaller than a frame reset time (frame scan time).

As illustrated in FIG. 12, the timing controller 300 generates frame timing independent to each of the frame reset and the frame scan, and a rolling shutter operation is performed while the frame reset and the frame scan are indefinitely repeated with a time difference of an exposure time smaller than the line time.

FIG. 13 illustrates rolling shutter operation timing in the unit of a frame when the exposure time is larger than the frame reset time (frame scan time).

As illustrated in FIG. 13, the timing controller 300 generates frame timing independent to each of the frame reset and the frame scan, and a rolling shutter operation is performed while the frame reset and the frame scan are indefinitely repeated with a time difference of an exposure time larger than the time line. In this case, after the sub frame reset, an idle time corresponding to the difference between the exposure time and the sub frame reset time may be included.

Figure 14:
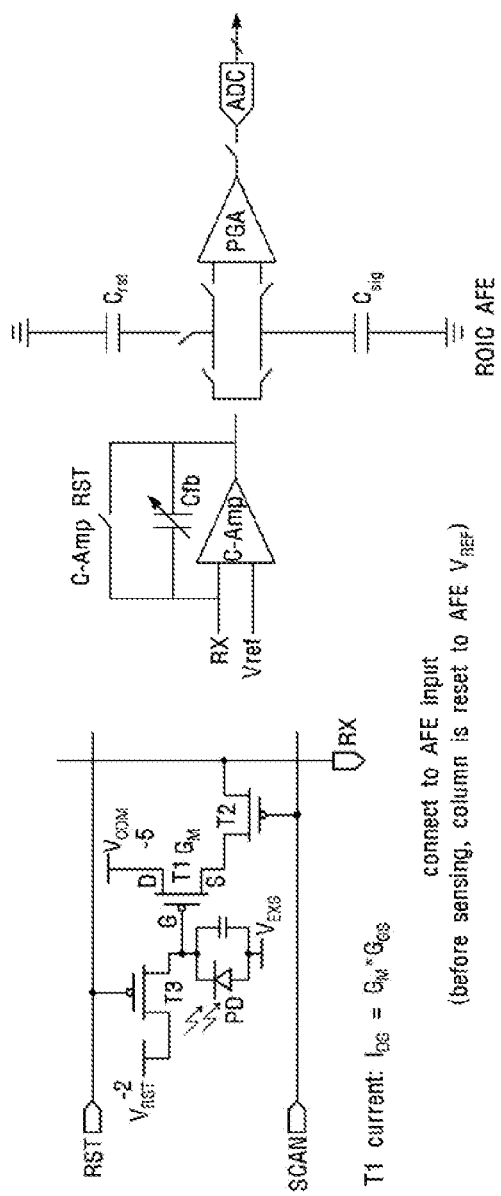
FIG. 14 illustrates active pixel circuit and sensor structures.
Figure 15:
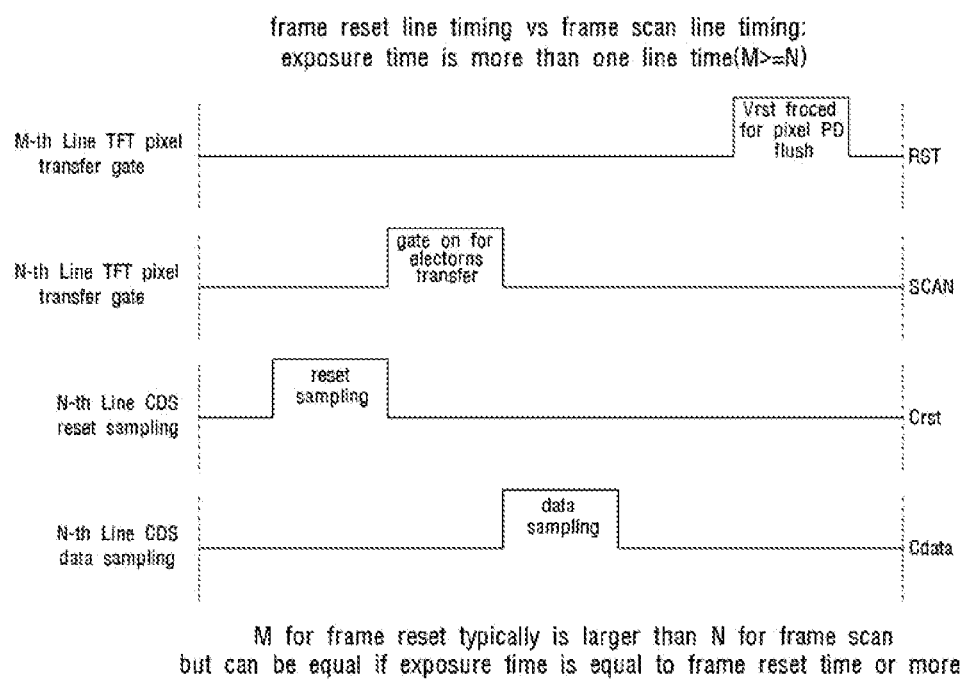
FIGS. 15 and 16 illustrate signal generation timing in a method of controlling rolling shutter timing according to the present invention.
Figure 16:
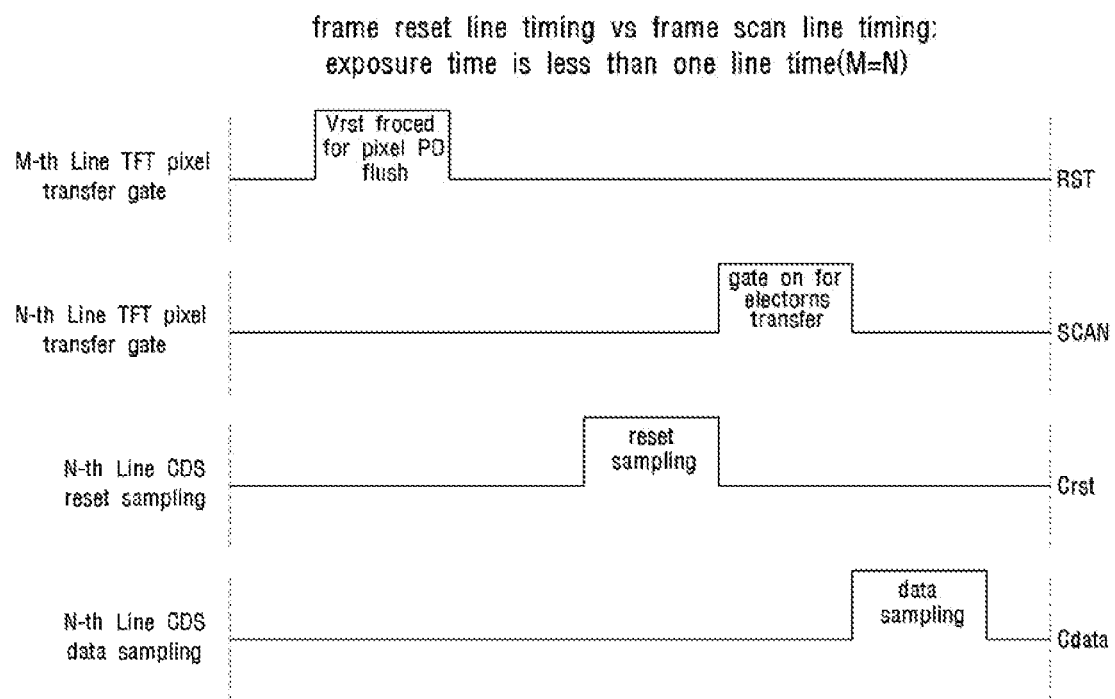

FIG. 14 illustrates active pixel circuit and sensor structures, and FIGS. 15 and 16 illustrate signal generation timing in the method of controlling rolling shutter timing according to the present invention.

An active pixel circuit uses a method of converting charge into voltage in each pixel. In the active pixel circuit, each of the reset signal and the scan signal is applied, and a transistor for converting the charge accumulated in the capacitance of the photo diode into voltage is added. A transistor for a scan operation of reading a signal and a reset operation of reading the signal and then flushing the signal is further included, and as illustrated in FIG. 14, it is common that the active pixel circuit is implemented with a 3T configuration including three transistors, but may also be implemented with a 4T configuration or a photo gate configuration.

In particular, in the 3T structure, three transistors are used in one pixel, and are called a reset TR, a source-follower TR, and a row-select TR. First, when a voltage is applied to a gate of the reset TR, an integration node voltage is set to a high voltage and the reset operation is performed. Then, when the reset TR is turned off, electrons among photo-generated carriers generated in the photo diode are drifted toward an integration node having a relatively higher voltage, so that the integration node voltage becomes smaller. In this case, the dropped voltage samples the voltage that is reset again in a next phase, and determines the amount of light incident to the pixel by using a difference between the two voltages. The 3T structure has an advantage that low voltage driving is possible. A Read-Out IC (ROIC) circuit is illustrated at the right side of FIG. 14.

FIG. 15 illustrates signal generation timing when an exposure time is larger than one line time in the method of controlling rolling shutter timing according to the present invention. As illustrated in FIG. 15, when the exposure value (exposure time) is larger than one line time of the scan/reset, the timing controller 300 controls the scan signal to be generated before the reset signal.

In the case where the exposure value (exposure time) is larger than the one line time of the scan/reset, the case where the exposure value is larger than the frame reset (frame scan) time has the following relational expression.

$$\text{Exposure value(exposure time)} = \text{Frame reset time} - \text{Idle time} \quad (1)$$

$$\text{Idle time} = \text{Exposure value(exposure time)} - \text{Frame reset time} \quad (2)$$

The M-th line of the (L+1)th frame reset and the N-th line of the L-th frame scan are the same line, so that the relationship of M=N is provided in FIG. 15.

In the case where the exposure value (exposure time) is larger than the one line time of the scan/reset, the case where the exposure value is smaller than the frame reset (frame scan) time has the following relational expression.

$$\text{Exposure value of } M\text{-th line of frame reset and } N\text{-th line of frame scan} = (N-M) \times \text{line time} \quad (i)$$

As a result, as illustrated in FIG. 15, when the exposure value (exposure time) is larger than the one time line of the scan/reset, the relationship expression of M>=N is given.

For the M-th line time and the N-th line time, the exposure value is typically aligned in the unit of the line time, but the adjustment is required at the level of "one line time+pixel clock" or "several line times+pixel clocks", the exposure value may be adjusted in a pixel clock unit at the level at which a frame reset line timing signal (RST and the like) and a frame scan line timing signal (SCAN, CDS, and the like) do not overlap at the same time.

FIG. 16 illustrates signal generation timing when an exposure value (exposure time) is smaller than one line time in the method of controlling rolling shutter timing according to the present invention. As illustrated in FIG. 16, when the exposure value (exposure time) is smaller than one line time, the timing controller 300 controls the reset signal to be generated before the scan signal.

In the meantime, the method of controlling rolling shutter timing according to the present invention includes generating, by a first GOA driving unit, a reset signal for resetting an image sensor in the unit of a gate line, and generating, by a second GOA driving unit, a scan signal for scanning the image sensor in the unit of a gate line. The image sensor 200 may be an image sensor based on a thin-film transistor as described above. The first GOA driving unit and the second GOA driving unit includes the plurality of shift registers connected to the plurality of gate lines, respectively, of the image sensor. Generation timing of the reset signal and generation timing of the scan signal may be independently controlled by the timing controller 300.

In the meantime, when the frame reset and the frame scan of the image sensor are controlled with one scan signal, the logical sum of the reset signal and the scan signal generated in the first GOA driving unit and the second GOA driving unit, respectively, is used as the scan signal.

In particular, the generation of the reset signal and the scan signal is controlled based on a sub window enable signal for resetting or scanning a specific area in the entire area of the image sensor 200, and in this case, when the reset signal and the scan signal share the same enable signal in the line time, a control signal for time-dividing the enable signal and providing the time-divided enable signal may be generated.

Each of the frame reset and the frame scan is controlled with the independent frame timing, and the frame reset and the frame scan are indefinitely operated with a time difference corresponding to the exposure time, thereby implementing rolling shutter driving.

The method of controlling rolling shutter timing according to the present invention may further include controlling the scan signal to be generated before the reset signal when the exposure time exceeds the line time, and controlling the reset signal to be generated before the scan signal when the exposure time is equal to or smaller than the line time.

The image sensor 200 may be implemented with a passive pixel circuit or an active pixel circuit. The image sensor 200 includes a plurality of pixels defined by intersections of the plurality of rows of gate lines and the plurality of columns of data lines. The plurality of pixels includes a storage capacitor, a photo diode which detects light reflected from a fingerprint and is incident and changes a potential state of the storage capacitor, and a thin film transistor. The thin film transistor is connected to the storage capacitor and the photo diode and transmits a detection signal according to the potential state of the storage capacitor.

According to the device and the method of controlling rolling shutter timing based on GOA according to the present invention, it is possible to satisfy a bezel-less edge level of a display panel of a smart phone, expand a fingerprint recognition area to a large area by rapidly reading a fingerprint location area, freely control an exposure time, and reduce occurrence of a delay time.

According to the generalization of the TFT image sensor, the rolling shutter control method which may adjust the TFT image sensor with various exposure values may be usefully applied to various cases, and particularly, for fingerprint recognition solutions in large-area full screen smart device (for example, a smart phone), a bezel-less TFT image sensor is essentially required, and the device and the method of controlling rolling shutter timing based on GOA according to the present invention may be a solution suitable to the technical demand.

When the rolling shutter control method of the present invention, which introduces the GOA concept, is applied not only to the TFT image sensor, but also to the CIS image sensor that is currently generalized, it is possible to promote the effect of dramatically reducing a size of a gate control circuit block, compared to the case using a parallel decoding circuit.

The method of controlling rolling shutter timing based on GOA according to various exemplary embodiments may be implemented in a program command executable through various computer means and recorded in a computer readable medium. The computer readable recording medium may include one or a combination of a program command, a data file, and a data structure. The program command recorded in the medium may be specially designed and configured for the present invention, or may also be known and usable to those skilled in computer software. Examples of the computer readable recording medium include a magnetic medium, such as a hard disk, a floppy disk, or a magnetic tape, an optical recording medium, such as a CD-ROM or a DVD, a magneto-optical medium, such as a floptical disk, and a hardware device which is specifically configured to store and execute the program command such as a ROM, a RAM, and a flash memory. An example of the program command includes a high-level language code executable by a computer by using an interpreter, and the like, as well as a machine language code created by a compiler. The hardware device may be configured to be operated with one or more software modules in order to perform the operation of the present invention, and an opposite situation thereof is available. The method of controlling rolling shutter timing based on GOA according to various exemplary embodiments may also be implemented in the form of a computer program or an application which is stored in a recording medium and executed by a computer.

In addition, although the exemplary embodiments have been described above, these are only examples, and do not limit the present invention, and those skilled in the art will know that various modifications and applications which are not exemplified above are possible within the scope without departing from the essential characteristics of the present exemplary embodiment. For example, each component specifically presented in the exemplary embodiment may be modified and implemented. Further, it should be interpreted that the differences in relation to the modification and the application are included in the scope of the present invention defined in the accompanying claims.

The invention claimed is:

1. A device for controlling rolling shutter timing, the device comprising:
   a first Gate-On-Array (GOA) driving unit configured to generate a reset signal for resetting an image sensor in a unit of a gate line;
   a second GOA driving unit configured to generate a scan signal for scanning the image sensor in the unit of the gate line; and
   a timing controller configured to control generation timing of the reset signal and the scan signal, wherein when an exposure value (exposure time) is larger than one line time, the timing controller controls the scan signal to be generated before the reset signal, and when the exposure value (exposure time) is smaller than one line time, the timing controller controls the reset signal to be generated before the scan signal.

2. The device of claim 1, wherein when frame reset and frame scan of the image sensor are controlled with one scan signal, a logical sum of the reset signal and the scan signal, which are generated in the first GOA driving unit and the second GOA driving unit, respectively, is used as a scan signal.

3. The device of claim 1, wherein the generation of the reset signal and the scan signal is controlled based on a sub window enable signal for resetting or scanning a specific area in an entire area of the image sensor.

4. The device of claim 3, wherein when the reset signal and the scan signal share the same enable signal in a line time, the timing controller generates a control signal for time-dividing the enable signal and providing the time-divided enable signal.

5. The device of claim 1, wherein the timing controller generates frame timing independent to each of frame reset and frame scan, and controls the frame reset and the frame scan to be indefinitely operated with a time difference corresponding to an exposure value.

6. The device of claim 1, wherein the first GOA driving unit and the second GOA driving unit include a plurality of shift registers connected to a plurality of gate lines, respectively, of the image sensor.

7. The device of claim 1, wherein the image sensor includes a plurality of pixels defined by intersections of a plurality of rows of gate lines and a plurality of columns of data lines, and
the plurality of pixels includes:
a storage capacitor;
a photo diode configured to detect light which is reflected from a fingerprint and incident, and changes a potential state of the storage capacitor; and
a thin film transistor connected to the storage capacitor and the photo diode, and configured to transmit a detection signal according to the potential state of the storage capacitor.

8. A method of controlling rolling shutter timing, the method comprising:
generating, by a first Gate-On-Array (GOA) driving unit, a reset signal for resetting an image sensor in a unit of a gate line; and
generating, by a second GOA driving unit, a scan signal for scanning the image sensor in the unit of the gate line,
wherein the image sensor is an image sensor based on a thin film transistor,
the first GOA driving unit and the second GOA driving unit include a plurality of shift registers connected to a plurality of gate lines, respectively, of the image sensor, and
generation timing of the reset signal and generation timing of the scan signal are separately controlled, when an exposure value (exposure time) is larger than a line time, controlling the scan signal to be generated before the reset signal, and when the exposure value (exposure time) is smaller than the line time, controlling the reset signal to be generated before the scan signal.

9. The method of claim 8, wherein when frame reset and frame scan of the image sensor are controlled with one scan signal, a logical sum of the reset signal and the scan signal, which are generated in the first GOA driving unit and the second GOA driving unit, respectively, is used as a scan signal.

10. The method of claim 8, wherein the generation of the reset signal and the scan signal is controlled based on a sub window enable signal for resetting or scanning a specific area in an entire area of the image sensor.

11. The method of claim 10, wherein when the reset signal and the scan signal share the same enable signal in a line time, a control signal for time-dividing the enable signal and providing the time-divided enable signal is generated.

12. The method of claim 8, wherein each of frame reset and frame scan is controlled with independent frame timing, and the frame reset and the frame scan are indefinitely operated with a time difference corresponding to an exposure value.

* * * * *